United States Patent [19]

Benker

[11] Patent Number: 5,618,767

[45] Date of Patent: Apr. 8, 1997

[54] PROCESS FOR PRODUCING CERAMIC COMPONENTS OF SILICON CARBIDE

[75] Inventor: Werner Benker, Selb, Germany

[73] Assignee: Hoechst CeramTec Aktiengesellschaft, Selb, Germany

[21] Appl. No.: 584,386

[22] Filed: Jan. 11, 1996

Related U.S. Application Data

[62] Division of Ser. No. 368,643, Jan. 4, 1995, abandoned.

[30] Foreign Application Priority Data

Jan. 5, 1994 [DE] Germany .......................... 44 00 131.2

[51] Int. Cl.$^6$ .................................................. C04B 35/565
[52] U.S. Cl. ................................ 501/90; 264/62; 264/63; 427/443.2
[58] Field of Search .......................... 501/90; 427/443.2; 264/62, 63

[56] References Cited

U.S. PATENT DOCUMENTS

| | | | |
|---|---|---|---|
| 4,537,735 | 6/1985 | Enomoto et al. | 501/90 X |
| 4,552,918 | 11/1986 | Lörcks et al. | 524/734 |
| 4,788,168 | 11/1988 | Ogawa et al. | 501/90 X |
| 4,796,077 | 1/1989 | Takeda et al. | 501/90 |
| 4,837,231 | 6/1989 | Endo et al. | 501/90 |
| 5,192,719 | 3/1993 | Yamauchi et al. | 501/90 X |
| 5,205,970 | 4/1993 | Brun et al. | 501/90 X |
| 5,302,561 | 4/1994 | Ezie | 501/90 X |
| 5,324,692 | 6/1994 | Benker et al. | 501/90 X |

FOREIGN PATENT DOCUMENTS

| | | |
|---|---|---|
| 0147478A1 | 7/1985 | European Pat. Off. . |
| 0064606 | 1/1986 | European Pat. Off. . |
| 0129227 | 5/1988 | European Pat. Off. . |
| 3231100 | 5/1991 | Germany . |
| 4315690 | 6/1994 | Germany . |
| 1-157803 | 6/1989 | Japan . |
| 2104103 | 3/1983 | United Kingdom . |

OTHER PUBLICATIONS

Derwent–Abstract J 60191081–A, Sep. 28, 1985 (8546), JP.

J. Kriegesmann, "Die Technologien der modernen Slliclumcarbiderkamiken", Keramisohe Zeitschrift, 1989, vol. 41, No. 1, pp. 17–18, 21–22.

ESK EKasic®–Slliciumcarbid–Sinterkörper.

Kato et al., "Sintered Sllicon Carbide of High Density and Strength", Chemical Abstracts, vol. 109, No. 10, Columbus, OH, US abstract No. 78539, May 1988.

Narumi Seito KK, "Mfg. Silicon Carbide Sintered Compact", Derwent Publications Ltd., London, GB, An 88–158908, May 1988.

Kreigsmann, Die Technologien Der Modern Siliciumcarbidkeramiken, 1988, pp. 857–863.

Brochure of Cerestar Deutschland GmbH: Stärken für chemisch–techniche Industrien. "No Date".

Primary Examiner—Karl Group
Attorney, Agent, or Firm—Foley & Lardner

[57] ABSTRACT

The invention relates to a process or producing components of silicon carbide with addition of carbon and/or carbon-containing binders, in which the carbon is obtained at least in part by pyrolysis of the binders in the green component. The binder used is, according to the invention, modified starch preferably with a sulfamate or a sulfonic ester which is dispersible and/or soluble and/or dissolved in water.

20 Claims, No Drawings

PROCESS FOR PRODUCING CERAMIC COMPONENTS OF SILICON CARBIDE

This application is a division, of application Ser. No. 08/368,643, filed Jan. 4, 1995 now abandoned.

The invention relates to a process for producing components of silicon carbide with addition of carbon and/or carbon-containing binders, with the carbon being obtained at least in part by pyrolysis of the binders in the green component.

Components of silicon carbide-rich ceramics are used in a very wide range of applications, in particular as wear parts such as nozzles and linings or as machine components such as bearing, sliding and sealing elements or as components for heat engineering such as burner tubes and heat exchangers.

From DE-C-32 31 100 it is known that temporary binders of an organic nature can be used in the production of ceramic components of silicon carbide, these binders being converted into carbon by heat treatment. On the one hand, the carbon gives the components the necessary strength for machining after carbonization, on the other hand it provides a reactant for the subsequent sintering or infiltration process. In particular, reference is de to phenolic resins and the like. However, most phenolic or phenyl-containing aromatic compounds which give a carbonization residue of ≧30% have the disadvantage of, on thermal decomposition with exclusion of oxygen, liberating dissociation products such as phenol, formaldehyde, cresol, xylene and benzene which are hazardous to health and in production lead to considerable problems because of their complicated disposal and, in addition, make expensive safety precautions necessary. In the preparation and further processing of phenolic resin-containing compositions, appropriate safety measures are required.

On pyrolysis, the organic binders themselves form carbon bridges which give the component sufficient strength for machining and during the reaction sintering process react with silicon to give secondary silicon carbide. In the production of sintered silicon carbide, it is generally known that carbon has to be used to free the surfaces of the silicon carbide powder of adhering $SiO_2$ layers. Without addition of carbon, the sintering process would be prevented or strongly hindered. Comparable to the production of silicon-infiltrated SiC, it is known that aromatic, carbonizable binders can be used as carbon source. These are preferably predissolved in a solvent to achieve as uniform as possible a distribution of the same on the powder particles.

In the production of carbon or graphite bodies, use is likewise made of aromatic compounds which are converted into carbon by pyrolysis. It is here sometimes customary to carry out impregnation with dissolved aromatic compounds and carbonization of a component a plurality of times, so as to optimize the properties.

A further disadvantage of the known organic additives is the high temperature in the range from about 1000 to 1200° C. which is required for really complete pyrolysis.

It is an object of the present invention to provide a new production process for components of silicon carbide, which makes it possible to achieve complete carbonization at low temperatures of ≦700° C. in which no dissociation products which are difficult to dispose of are to be liberated during carbonization and in which the composition can be prepared, if possible, using aqueous systems.

The invention achieves this object by means of a production process of the type described in the introduction, whose distinguishing feature is that the binder used is starch which is dispersible, soluble and/or dissolved in water (frequently obtained as solution in the starch production process), preferably as starch solution.

Suitable starch products for the production according to the invention of silicon carbide-rich ceramics are those of virtually any type, which are usually in powder form. However, to make the starch usable for the production process of the invention, it is necessary to use the starch completely dispersed and/or completely dissolved either in cold or in hot water. It is here possible only in exceptional cases to achieve concentrations of 40% by weight or more of solids, based on the total weight of the mixture of solids plus water, without obtaining a viscosity which is too high for the further production process. Although the viscosity could be reduced by addition of water, this would have to be removed again by means of increased energy consumption during the subsequent drying process of the composition or the components produced therefrom. A further disadvantage of the use of starch products in powder form is that during dissolution and/or make-up there can remain undissolved or gel-like constituents which show up in the fired component in the form of flaws (e.g. pores and pores which have been closed by silicization) and thus impair the mechanical properties of the material and the homogeneity of the microstructure. These pores are formed by burnout of the undissolved or gel-like constituents and can be filled with silicon during silicization.

In practice it has therefore been found to be particularly preferable and advantageous in the production process to add the starch as a boiled aqueous solution containing up to 75% of solids and having a viscosity in the range from 100 to 5000 mPa.s. This preferred starch can be added without dilution to the preparation process of ceramic slips. The starch is preferably based on potato, maize and/or wheat starch, and most preferably comprises maize starch modified by sulfamates, other sulfonic esters or sulfur-free organics. The starch is preferably employed in an amount from 3 to 20% by weight, based on the total weight of the solids in the mixture, and most preferably in an amount from 6 to 10% by weight, again based on the total weight of the solids. By means of its specific modification, e.g. via sulfamates, other sulfonic esters or sulfur-free organics, there forms, during decomposition with exclusion of oxygen, a very uniformly distributed, three-dimensionally crosslinked carbon skeleton which gives the component sufficient strength for machining. A further advantage compared with the conventional binders such as pitch, tar or resin is that the pyrolysis temperature necessary for the complete decomposition of the starch is in the range from 200° to 700° C., as shown by the DTA-TG curve. In fact, binders according to the present invention preferably thermally decompose at temperatures less than or equal to 650° C. After pyrolysis, the carbon content of the binder should be preferably be less than 35% by weight, most preferably based on the weight of the binder less than 25weight. Pitches, tars and resins have to be heated, depending on the modification, to from 900° C. to 1100° C. to achieve complete decomposition. In comparison, use of starch according to the invention allows a considerable saving in energy to be realized.

A further advantage of the process preferred according to the invention is that the starch product used is miscible in any proportion with water and, owing to its fluid consistency, ensures very good wetting of the silicon carbide and carbon raw materials used. If equally good wetting is to be achieved with resins or pitch, recourse has to be made to organic solvents such as acetone, isopropanol, toluene, etc., which should be avoided from the point of view of environmental pollution and the working conditions in production.

Owing to the liquid form of the starch, a very thin layer is applied to the silicon carbide and carbon particles to be crosslinked to one another, which layer leaves a similarly thin carbon layer behind after thermal decomposition. This suffices to give the component sufficient strength to make machining possible. This means that, in comparison with binder solutions of comparable concentration, such as phenolic resins, in the comparative examples, significantly less pyrolytically generated carbon is required to achieve the same mechanical strength. To achieve a similar effect, liquid phenol resol resins were tested, but these have the disadvantage, on the one hand, that they contain up to 20% by weight of free phenol and, on the other hand, can be mixed or diluted with water only to a limited extent which gives rise to the danger of flocculation. Pitch and tar are only suitable for the preparation of compositions by mixing and kneading processes, but not for the preparation of slips for spray drying or for slip casting.

Components of silicon-infiltrated silicon carbide are usually produced from a mixture comprising silicon carbide powder made up of one or more mixed particle-size fractions which form the skeletal substance, carbon in the form of graphite, coke, carbon black, etc., which reacts in the infiltration process to form secondary silicon carbide, connecting the primary silicon carbide particles initially introduced and thus contributing to the improvement in the properties of the material, and in all cases in which the components are to be machined prior to the infiltration process, a thermally decomposable binder which forms carbon on decomposition. The silicon carbide shaped components are preferably silicon-containing SiC (SiSiC), silicide-containing SiC, carbon-rich SiSiC (CSiSiC), sintered SiC (SSiC), hot-presses SiC (HPSiC) or hot isostatically pressed SiC (HIPSiC). The specified components of the mixture are dissolved or suspended in water and the slip formed therefrom is, for example, converted into a pressable or drawable granular material by means of spray drying. An alternative processing method for the slip, e.g. by slip casting, pressure casting, tape casting and extrusion, is always possible by matching the water content of the slip and, if required, addition of additives such as plasticizers or softeners known to the ceramic engineer to the amount favorable for the respective process. A blank is then made from the granular material thus obtained by means of die pressing or isostatic pressing. This is followed by heat treatment with exclusion of oxygen in which the binders used are decomposed and converted into carbon. The dissociation products detected in the thermal decomposition are essentially only $CO_2$ and $H_2O$. Many possible dissociation products are below the detection limit. In this heat treatment, the carbon deposited from the binder connects the silicon carbide and carbon particles to one another, which leads to an increase in the carbonized strength. The blank can subsequently be machined, for example by means of cutting methods. After machining, the components are infiltrated with silicon in the infiltration process, in which both the carbon initially introduced and the carbon obtained from the binder by pyrolysis are converted into secondary silicon carbide.

The advantages of the invention are essentially that processing can be carried out on an aqueous basis and the dissociation products formed during pyrolysis are environmentally acceptable.

Contrary to the prevailing opinion that a binder having a very high carbon residue is advantageously used, it has surprisingly been found that a binder having a substantially lower carbon residue at the same concentration leads to the same strength level on carbonization. Components prepared according to the present invention may exhibit strengths of greater than or equal to 35 MPa, and most preferably have strengths equal to or exceeding 400 MPa.

The invention is illustrated below by way of example, without being limited to the concrete embodiments presented. The feature of carbonized strength, measured in the context of the Examples and Comparative Examples, was measured by a peak compressive strength determination on annular test specimens having an external diameter of 80 mm, an internal diameter of 40 mm and a thickness of 30 mm.

EXAMPLE 1

59.6% by weight of a silicon carbide powder having a mean particle size of 45 µm, 11.6% by weight of a silicon carbide powder having a mean particle size of 13 µm and 9.6% by weight of a silicon carbide powder having a mean particle size of 3 µm, together with 9.6% by weight of carbon black and 9.6% by weight of an aqueous starch solution having a solids content of 70% by weight of a sulfamate-modified starch, which has a carbonization residue of 20%, are, with the aid of a suitable fluidizer, completely dispersed in water without any gel-like residues. Suitable fluidizers are, for example, lignin derivatives and similar agents. A pressable granular material is produced therefrom by means of spray drying. Dry pressing is then used to make annular compacts having the following geometry: external diameter 80× internal diameter 40× thickness 30 mm, which have a pressed density of 2.17 g/cm$^3$. After the pyrolysis process at a temperature of 600° C., the density of the carbonized compact was 2.11 g/cm$^3$ and its carbonized strength was 7.0 MPa. The compacts were subsequently machined to a geometry of 75×45×10 mm, with two components being made from each compact. These were infiltrated with silicon in vacuo and ground on all sides. The density of the finished components was 3.08 g/cm$^3$. The strength of the silicized components was determined as 418 MPa by means of the peak pressure test method. Polished sections showed no pores and no pores which had been silicized closed.

COMPARATIVE EXAMPLE 1

62.3% by weight of a silicon carbide powder having a mean particle size of 45 µm, 11.8% by weight of a silicon carbide powder having a mean particle size of 13 µm and 9.9% by weight of a silicon carbide powder having a mean particle size of 3 µm, together with 9.0% by weight of carbon black and 7.0% by weight of phenolic resin powder having a carbonization residue of about 50%, are dispersed in water with the aid of a suitable fluidizer. A pressable granular material is produced therefrom by means of spray drying. Dry pressing is then used to make compacts having a geometry of 80×40×30 mm which have a pressed density of 2.16 g/cm$^3$. After the pyrolysis process at a temperature of 950° C., the density of the carbonized compact was 2.08 g/cm$^3$ and its carbonized strength was 6.4 MPa. The compacts were subsequently machined to a geometry of 75×45×10 mm, with two components being made from each compact. These were infiltrated with silicon in vacuo and ground on all sides. The density of the components was 3.08 g/cm$^3$. The strength of the silicized components was determined as 272 MPa by means of the peak pressure test method. Polished sections had some pores and pores which had been silicized closed.

COMPARATIVE EXAMPLE 2

2.8% by weight of a silicon carbide powder having a mean particle size of 13 µm, 15.3% by weight of a silicon carbide powder having a mean particle size of 3 μm, together with 12.0% by weight of carbon black and 10.0% by weight of phenolic resin powder having a carbonization residue of about 50%, are dispersed in water with the aid of a suitable fluidizer. A pressable granular material is produced therefrom by means of spray drying. Dry pressing is then used to make annular compacts having a geometry of 80×40×30 mm which have a pressed density of 2.05 g/cm$^3$. After the pyrolysis process at a temperature of 950° C., the density of the carbonized compact was 1.92 g/cm$^3$ and its carbonized strength was 6.3 MPa. The compacts were subsequently machined to a geometry of 75×45×10 mm, with two components being made from each compact. These were infiltrated with silicon in vacuo and ground on all sides. The density of the components was 3.07 g/cm$^3$. The strength of the silicized components was determined as 342 MPa by means of the peak pressure test method. Polished sections had individual pores and pores which had been silicized closed.

EXAMPLE 2

63.0% by weight of a silicon carbide powder having a mean particle size of 13 μm and 15.8% by weight of a silicon carbide powder having a mean particle size of 3 μm, together with 12.0% by weight of carbon black and 10.0% by weight of an aqueous starch solution having a solids content of about 70% by weight of a starch modified by sulfur-free organics, which has a carbonization residue of about 20%, are, with the aid of a suitable fluidizer, completely dispersed in water without leaving a residue. A pressable granular material is produced therefrom by means of spray drying. Dry pressing is then used to make compacts having a geometry of 80×40×30 mm which have a pressed density of 2.01 g/cm$^3$. After the pyrolysis process at 600° C., the density of the carbonized compact was 1.96 g/cm$^3$ and its carbonized strength was 6.2 MPa. The compacts were subsequently machined and brought to a geometry of 75×45×10 mm, with two components being made from each compact. These were infiltrated with silicon in vacuo and ground on all sides. The density of the components was 3.07 g/cm$^3$. The strength of the silicized components was determined as 355 MPa by means of the peak pressure test method. Polished sections showed the microstructure to be free of pores and pores which had been silicized closed.

EXAMPLE 3

68.2% by weight of a silicon carbide powder having a mean particle size of 3 μm, together with 22.7% by weight of carbon black and 9.1% by weight of an aqueous starch solution having a solids content of about 70% by weight of a sulfamate-modified starch, which has a carbonization residue of about 20%, are, with the aid of a suitable fluidizer, completely dispersed in water without leaving a residue. A pressable granular material is produced therefrom by means of spray drying. Dry pressing is then used to make annular compacts having a geometry of 80×40×30 mm which have a pressed density of 1.70 g/cm$^3$. After the pyrolysis process at 600° C., the density of the carbonized compact was 1.65 g/cm$^3$ and its carbonized strength was 7.1 MPa. The compacts were subsequently machined and brought to a geometry of 75×45×10 mm, with two components being made from each compact. These were infiltrated with silicon in vacuo and ground on all sides. The density of the components was 3.10 g/cm$^3$. Using the 4-point bend test, a strength of 421 MPa was determined on test bars having a geometry of 3×4×50 mm. Using the modified starch, it was possible for the first time to completely avoid the high proportion of large silicon-filled pores in the very fine grain material and also to thereby achieve a surprisingly high strength for SiSiC materials. The microstructure was also found to be free of pores.

COMPARATIVE EXAMPLE 3

70.0% by weight of a silicon carbide powder having a mean particle size of 3 μm, together with 19.0% by weight of carbon black and 11.0% by weight of phenolic resin powder having a carbonization residue of about 50%, are dispersed in water with the aid of a suitable fluidizer. A pressable granular material is produced therefrom by means of spray drying. Dry pressing is then used to make annular compacts having a geometry of 80×40×30 mm which have a pressed density of 1.84 g/cm$^3$. After the pyrolysis process at 950° C., the density of the carbonized compact was 1.77 g/cm$^3$ and its carbonized strength was 6.5 MPa. The compacts were subsequently machined and brought to a geometry of 75×45×10 mm, with two components being made from each compact. These were infiltrated with silicon in vacuo and ground on all sides. The density of the components was 3.08 g/cm$^3$. Using the 4-point bend test, a strength of 357 MPa was determined on test bars having a geometry of 3×4×50 mm. Some pores and many pores which had been silicized closed were found in the microstructure.

In all Examples, gas analyses of the furnace atmosphere were carried out after the carbonization step, giving the following results:

| Content of: | Each in [mg/m$^3$] | | |
| --- | --- | --- | --- |
| | Phenols | Formaldehyde | Cresol |
| Examples 1–3: | 0.07–0.14 | 0.04–0.15 | — |
| Comparative Examples 1–3: | 1.7–4.8 | 0.4–1.6 | 0.1–0.6 |

I claim:

1. A process for producing shaped components of silicon carbide comprising:

admixing a silicon carbide powder, optionally a carbon component, and a binder comprising aqueous solution of starch modified by a sulfamate or a sulfonic ester to form a mixture, shaping the mixture into a shaped body, and infiltrating the shaped body with silicon or sintering the shaped body.

2. A process as claimed in claim 1, wherein prior to infiltrating or sintering, the shaped body is pyrolyzed, and after pyrolysis, the binder has a carbon residue of 35% by weight or less based on the weight of the binder.

3. A process as claimed in claim 2, wherein the carbon residue after pyrolysis of the binder is at most 25% by weight, based on the weight of the binder.

4. A process as claimed in claim 1, wherein the starch is added as an aqueous solution containing up to 75% of solids based on the total weight of the solution, and having a viscosity in the range from 100 to 5000 mPa.s.

5. A process as claimed in claim 1, wherein the binder is completely thermally decomposed at temperatures ≦700° C.

6. A process as claimed in claim 5, wherein the binder is completely thermally decomposed at temperatures ≦650° C.

7. A process as claimed in claim 1, wherein the starch is added in an amount of from 3 to 20% by weight, based on the total weight of solids present in said solution.

8. A process as claimed in claim 7, wherein the starch is added in an amount of from 6 to 10% by weight, based on the total weight of solids present in said solution.

9. A process as claimed in claim 1, wherein the starch used is soluble in cold and/or hot water, and is based on potato, maize or wheat starch.

10. A process as claimed in claim 1, wherein after forming said mixture, and prior to shaping, said mixture is processed into granular material.

11. A process as claimed in claim 1, wherein the shaping is carried out by slip casting, tape casting, pressure casting, extrusion or injection molding, or by axial or isostatic pressing.

12. A process as claimed in claim 1, wherein said shaped components are silicon-containing SiC silicide-containing SiC, carbon-rich SiSiC, hot presses SiC or hot isostatically pressed SiC.

13. A process as claimed in claim 1, wherein the aqueous solution of starch contains from 70–75% solids based on the total weight of said solution.

14. A process as claimed in claim 2, wherein the shaped body is pyrolyzed at a temperature ranging from 200° to 700° C.

15. A process as claimed in claim 1, wherein at least two different sizes of said silicon carbide powder are employed.

16. A process as claimed in claim 1, wherein said carbon component is employed and said carbon component comprises carbon black.

17. A process as claimed in claim 1, wherein said binder has a carbonization residue of less than 30% by weight, based on the weight of the binder.

18. A process as claimed in claim 9, wherein said starch is capable of being completely dispersed or completely dissolved in said aqueous solution.

19. A process as claimed in claim 1, wherein said starch is employed as a boiled aqueous solution.

20. A process as claimed in claim 1, wherein said shaped components are sintered SiC.

* * * * *